UNITED STATES PATENT OFFICE.

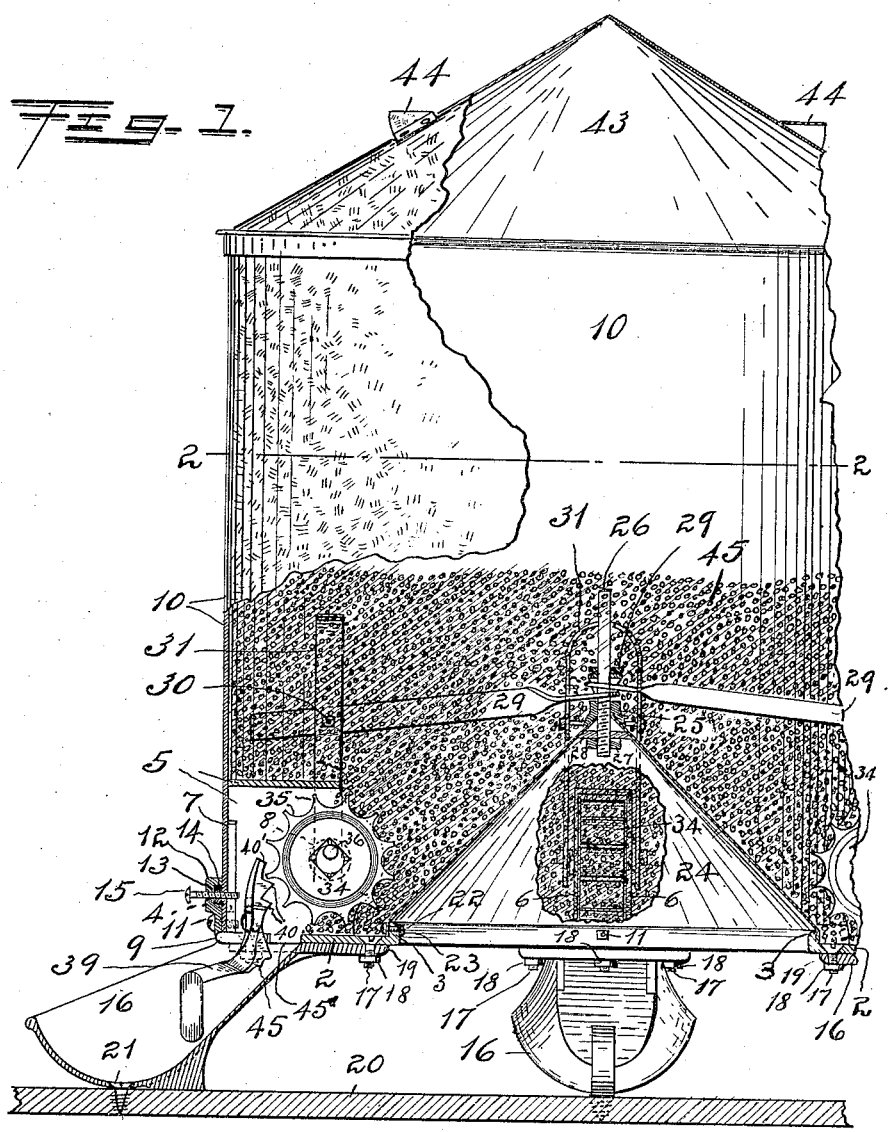

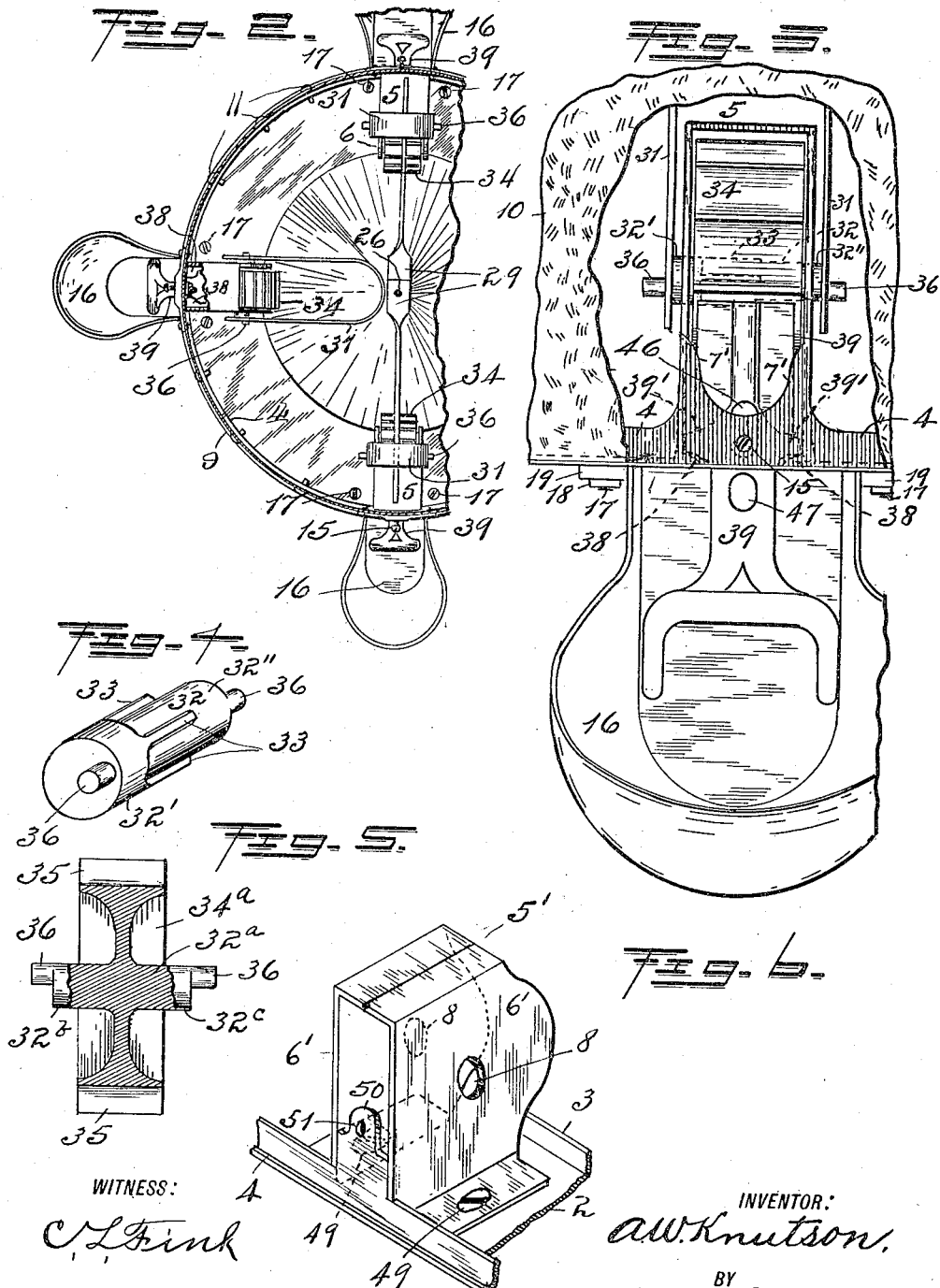

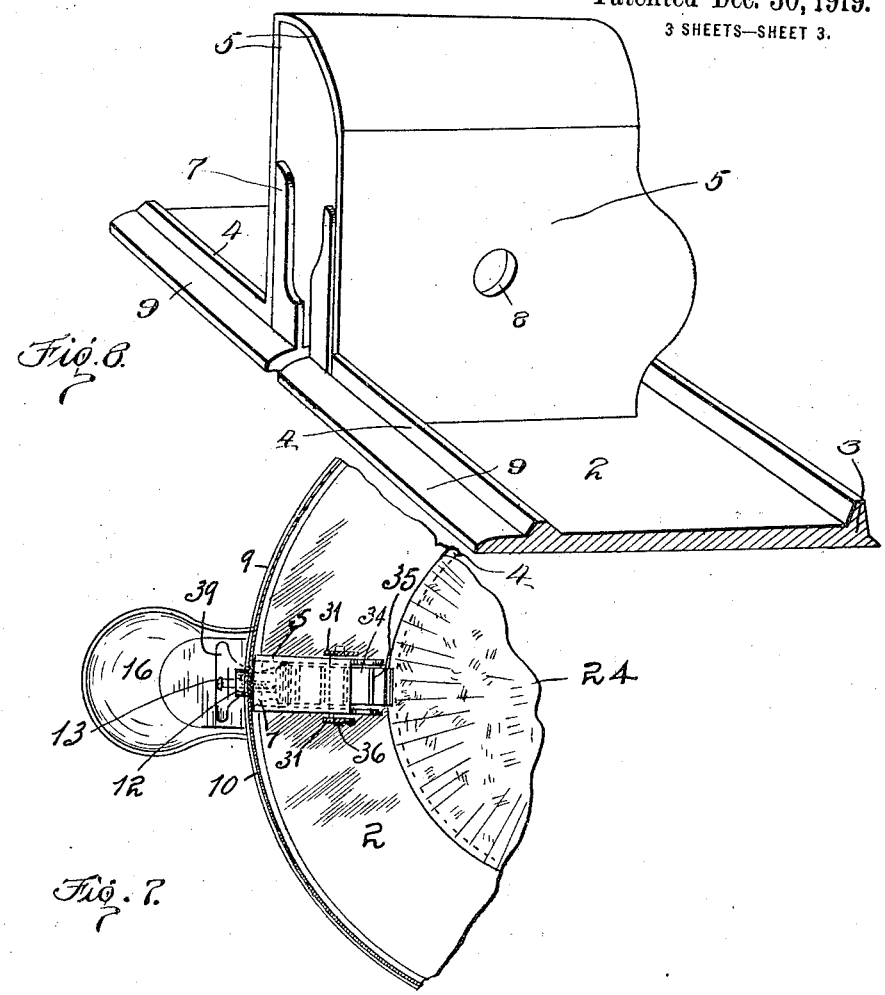

ALFRED W. KNUTSON, OF GALESBURG, ILLINOIS, ASSIGNOR, BY MESNE ASSIGNMENTS, TO SHAW, WELSH & COMPANY, OF GALESBURG, ILLINOIS, A CORPORATION OF ILLINOIS.

AUTOMATIC STOCK-FEEDER.

1,326,273.        Specification of Letters Patent.       Patented Dec. 30, 1919.

Application filed December 18, 1916. Serial No. 137,593.

*To all whom it may concern:*

Be it known that I, ALFRED W. KNUTSON, a citizen of the United States, and a resident of Galesburg, in the county of Knox and State of Illinois, have invented a new and useful Automatic Stock-Feeder, of which the following is a specification.

My present invention concerns that general class of feeders wherein a large quantity of feed is placed in a bin or other suitable receptacle from which small quantities may be successively released by an animal seeking food; and it relates especially to hog - feeders wherein the feed - releasing mechanism is actuated by a hog rooting or "nosing" thereagainst.

The general object of the invention is to improve the construction to increase the efficiency and utility, and to simplify and improve the mode of operation and thereby the certainty of perfect action of devices of this nature.

More specifically stated, one of the objects is to provide a novel agitator.

Another object is to provide novel means for imparting movements thereto.

Still another object is to provide an auxiliary agitator.

It is an object to provide novel means for controlling the size of each charge of feed released from the hopper or bin.

It is another object to provide a novel ring for supporting the case or wall of the hopper, and to provide for supporting said ring in a novel manner.

A special object is to provide a novel force-feed.

Another special object is to so hang the actuating-trigger that hinge-pins or the like are eliminated.

Still another object is to so construct the actuating-wheel and to so arrange it relatively to coacting parts, that should a cob or other obstruction accidentally be thrown into the hopper it will be broken and pass out into the cups.

To provide numerous novel structural features whereby to simplify and strengthen the construction and to materially aid in the assemblage or the disassemblage, constitutes another object.

Minor objects will presently appear. Some of these will be obvious and others particularly pointed out.

In the accompanying drawings:

Figure 1 is a vertical section, partly in elevation, of a preferred construction of feeder embodying my improvements;

Fig. 2, a horizontal section, its plane taken in the line 2—2 in Fig. 1;

Fig. 3, a slightly modified detail, in front elevation;

Fig. 4, a detail of the shaft or axle;

Fig. 5, a modification of the actuating-wheel and shaft;

Fig. 6, a modification showing one of the frames or housings made separate from but attached to the ring;

Fig. 7 is a horizontal sectional detail taken just above one of the housings, and Fig. 8 is a perspective of one of the housings and certain of its associated parts.

Considering the drawings in detail, and identifying like parts by the same and similar parts by similar reference numerals, 2 designates a base, made in the form of a ring having vertically arranged concentric flanges 3 and 4. Preferably cast integral with the ring are frames or housings 5 the spaced sides 6 of which are provided each with confronting stops 7 and with registering openings 8. Both the front and rear ends of each housing are open. Resting on an aunnlar shelf or ledge 9 of the ring is the hopper wall 10, secured to the flange 4 by screw bolts 11. 12, 12 designate clips each of which is secured to the wall 10 and flange 4 by a pair of said bolts. Each clip has a square socket 13 in which snugly fits a similarly shaped nut 14, whereby the latter is prevented from turning. 15 designates a set or feed-adjusting screw, for a purpose presently described.

16, 16 designate feed-cups, of which there may be any desired number. Each cup is secured to the ring 2 by means of bolts 17 and nuts 18, the bolts passing through said ring and through ears 19 on opposite sides of a projection from the cup. It is to be noted that the cups serve as supporting legs for the feeder, and that while the device is readily portable, it may if desired be permanently secured upon a floor 20 by means of screws 21.

Secured by bolts 22 and nuts 23 to the ring-flange 3 is the base of a cone 24 the apex of which is upward. Suitably secured on said apex is a nut 25 into which is threaded a stem 26 the lower end of which threads into a nut 27. 28 designates a washer. The inner ends of blade-like auxiliary agitators 29 are loosely mounted on the stem 26, their outer portions being hinged at 30 each to one of the primary or main agitators 31 presently described.

32, (Fig. 4) designates a shaft or rotatable axle having larger and smaller journal-like ends 32', 32'' respectively which rotate in the bearings afforded by the registering apertures 8 in that housing in which it is mounted. Its median portion is provided with ribs 33 which seat each in the corner of a square, centrally arranged opening in an actuating or feed wheel 34 having peripheral teeth or radii 35. Each shaft is provided at each of its ends with a crank stud 36. The respective ends of an inverted U-shaped agitator 31 are sprung onto these studs, after the wheel 34 has been positioned in the housing and the shaft 32 inserted therethrough and its journals arranged in their respective bearings. The spring-agitator retains the shaft in place. In Fig. 2 one of the agitators is shown as disconnected from the pin 30 and lying upon the cone, in which position it is very effective in loosening or agitating the material and causing it to move downward.

A portion of the ring is omitted beneath each housing 5, but the opening thus formed does not extend quite to the flange 4. Thus a pair of small ledges 38 are provided. The oppositely arranged lugs 39' of an actuating trigger 39 seat on each pair of these, whereby the trigger may merely be swung (the lugs acting as the fulcrum) or may be raised bodily. The upper end of the trigger is provided on its rear face with ratchet-teeth 40, and its upper terminal constitutes a tooth 40'. On the opposite face of its upper portion the trigger is provided with holes or pockets into which the point of the screw 15 may be projected in order to predetermine and regulate the quantity of material released at each actuation of the trigger. The lower portion of each trigger is projected outward and its terminal is made yoke-shaped, whereby it may readily be manipulated by a hog's snout. It sometimes occurs, in the use of prior devices, especially in feeding mash, chop, tankage, bran, etc., that the material will lodge or pack at the mouth of the device. In order to effectually prevent this I have provided the trigger with a cutter 45 which moves with each movement of the trigger and which thoroughly breaks up the lodged or packed material.

43 indicates a cover having handles 44. 45 denotes the stock-food.

The operation: It is preferable that the several triggers be first manually operated in order to cause one or more deposits of food to be discharged into each cup 16, in order that the animals may find the food therein. They quickly learn that by rooting or nosing around in the cups they will obtain food, and in so rooting they will strike the projecting yoke and thus raise the trigger bodily. Some one of its teeth is always in position to strike one of the radial teeth on the actuating-wheel 34 to thereby impart to it a part rotation rearwardly, whereby those of its teeth which are then lowermost will pull or drag the food forwardly, each successive tooth throwing a charge thereof through the mouth 45' and into the cup 16. As soon as the animal releases the trigger the latter will fall by gravity and tend to draw the charge of food with it, and if the latter be lodged the cutter 45 will act, as above described, to force with certainty the charge into the cup.

The mass of food in the hopper is prone to lodge or adhere, as is well known. In order to loosen it I have provided the crank-studs 36. Each pair of these revolves around the axis of the shaft 32 and acts as a crank in imparting agitating movement to the primary agitator 31—some degree or extent of such movement being transmitted at each actuation of its coacting wheel. The cone 24 directs the material toward all of the mouths, and the auxiliary agitators 29 loosen it. Should a cob or other obstruction pass into position to be discharged it would tend to lodge, but owing to the edges of the teeth of the wheel 34 being somewhat sharp, the obstruction will be broken into pieces and will be forced out by said wheel.

To lock any trigger from movement, whereby to effectively prevent food being discharged, the screw 15 is to be inserted in the hole 47 in the trigger, as shown in Fig. 3. The triggers provided in the forms of construction shown in Figs. 1, etc., are identical with that shown in Fig. 3 with respect to the apertures 46 and 47. To cause a half operation the movement of the trigger and thereby the agitating wheel (which is also a measuring wheel) is limited by engaging said screw with the hole 46 in the trigger; and to permit a full discharge of feed the screw may be either entirely removed or withdrawn to the position shown in Fig. 1.

In Fig. 3 I have shown slightly modified structural features of the housing, the stops being here indicated by 7', 7'.

Fig. 4 shows the crank-studs as lineally arranged, but one at and the other slightly offset from the peripheries of the respective ends of the shaft, this being necessitated by the relatively larger and smaller ends of the latter.

Fig. 5 shows an integral wheel and axle, designated by 34$^a$ and 32$^a$, and shows the crank-studs arranged each at the edge of its respective coacting journal 32ᵇ, 32ᶜ. This integral type of wheel and shaft may be employed in any separable housing, such, for instance, as the one shown in Fig. 6.

In Fig. 6 I have shown a modified form of housing 5', the halves 6', 6' thereof being secured to the ring 2 by screw-bolts 49. 50 indicates a tongue having an aperture 51 for the passage of the screw 15.

It is to be observed also that any one of the housings, together with the wheel, the shaft and its cam-studs, may be operated in a hopper, for the use of stockmen having small herds; that said devices are operable, (but not with such good results) without the agitators; and it is not essential that the bin be cylindrical, as shown, but that it may be in the shape of a segment, an elongated hopper, or of any other suitable shape.

I realize that considerable variation in the structural details of the invention, without departing from the spirit thereof, is possible. Therefore I by no means intend to limit myself to the specific forms herein shown and described except as specifically pointed out in the following claims, in which it is my intention to claim as broadly as is permitted by the state of the art all the novelty inherent in the invention. With this in view I claim as new:

1. In a stock-feeder, a ring having concentric flanges, a bin-casing secured to the outer one, a cone secured to the inner one, a feed-wheel adjacent said cone, means for actuating it, a stem connected with the cone, and an inverted substantially U-shaped agitator connected with both the stem and the feed-wheel.

2. In a stock-feeder, a hopper including a side-wall and a bottom on which it rests, a clip having an angular socket, means for securing it to the side-wall, a nut arranged in and held from rotation by said socket, a material-releasing element extending into the hopper, and a screw in threaded engagement with said nut, its inner end portion adapted to engage the last recited element.

3. In a stock-feeder, a base-ring having a plurality of openings, a hopper-wall surmounting and secured to said ring, food-discharging elements arranged above said ring, a plurality of cups with each of which one of said openings communicates, and a plurality of triggers each of which is adapted to actuate one of said food-discharging elements.

4. In a stock-feeder, a base-ring having a plurality of openings, a hopper-wall surmounting and secured to said ring, food-discharging elements arranged above said ring, cupped legs each of which communicates with one of said openings, and a plurality of triggers each of which is adapted to actuate one of said food-discharging elements.

5. In a stock-feeder, a source of material-supply, a material-discharging wheel arranged therein, and a trigger having a plurality of projections all of which are normally out of contact with, but either of which is adapted to operate it.

6. In a stock-feeder, a source of material-supply including a base, a material-discharging wheel arranged therein, and a trigger supported by but unattached to said base, and having a ratchet-tooth normally out of contact with but adapted to impart movement to said wheel and to drop by gravity after such actuation, said tooth adapted then to ratchet over said wheel.

7. In a stock-feeder, a hopper, a shaft rotatable therein, a feed-wheel having an opening in which said shaft is held from rotation, means for operating it and a clamp-like agitator holding the shaft from displacement from said wheel.

8. In a stock-feeder, a hopper, a shaft rotatable therein, a feed-wheel having an opening in which said shaft is held from rotation, means for operating it, and an agitator operated from the wheel and comprising a spring adapted to hold the shaft in said opening and adapted also to be swung onto or off from the shaft.

9. In a stock-feeder, a base having a discharge opening and having a shelf at each side thereof, a trigger having a pair of lugs adapted to rest upon said shelves, and a feed-wheel actuable by said trigger.

In testimony whereof I hereunto subscribe my name this 13th day of December, 1916.

ALFRED W. KNUTSON.